UNITED STATES PATENT OFFICE 2,087,396

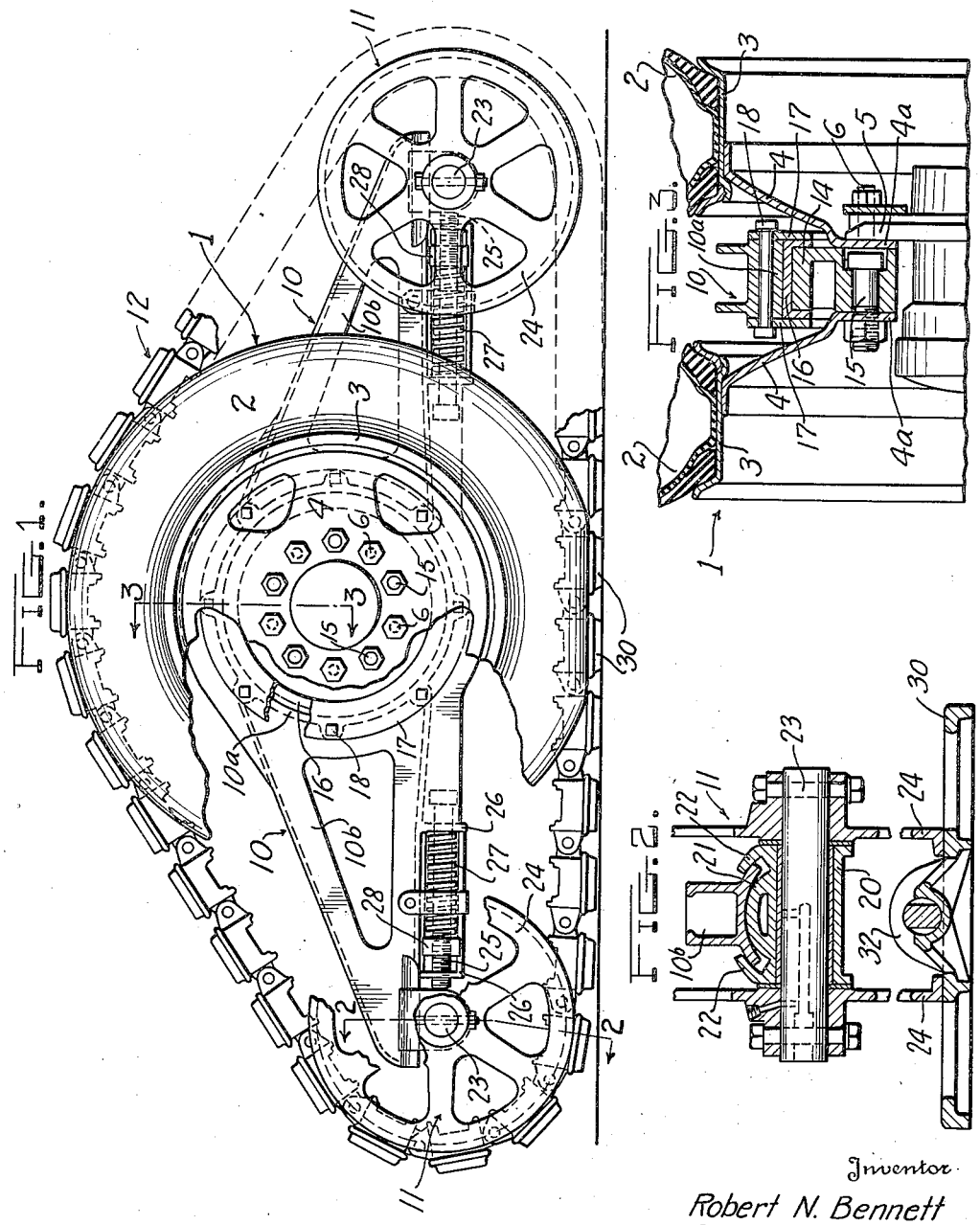

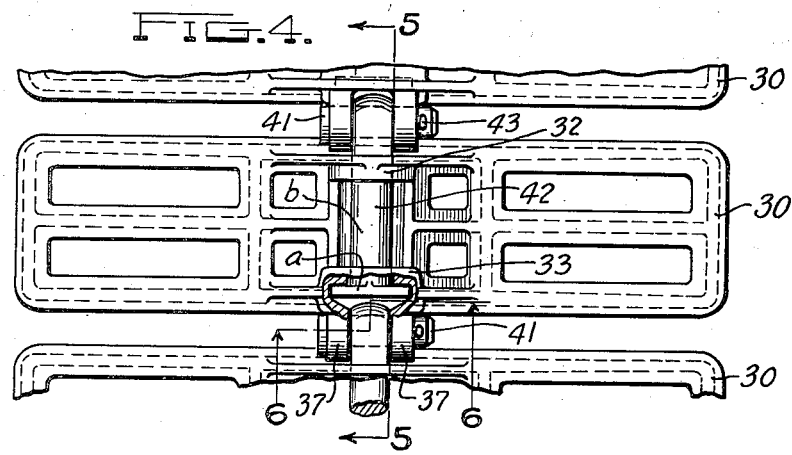
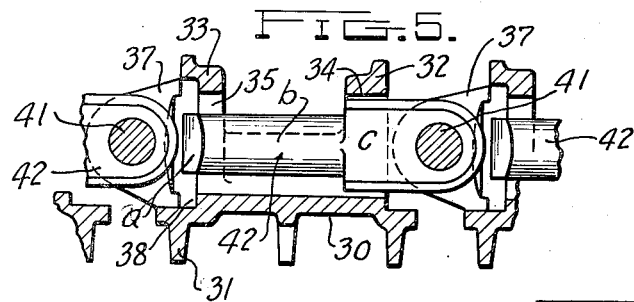
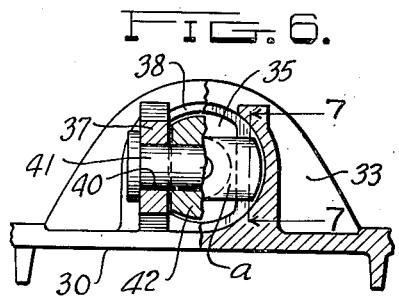
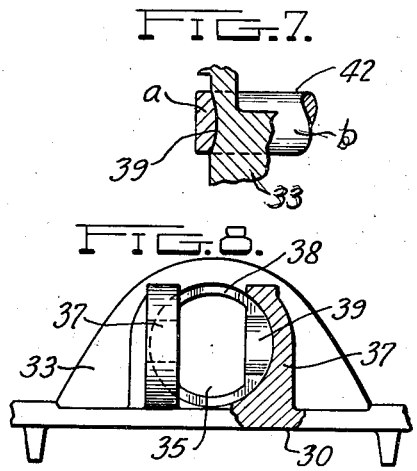
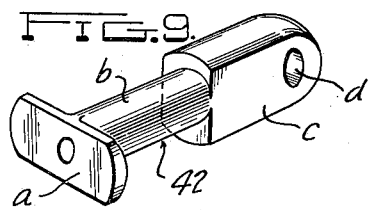
Inventor
Robert N. Bennett
Charles L. George

TREAD MEANS FOR DOUBLE TIRED WHEELS

Robert N. Bennett and Charles L. George, Findlay, Ohio, assignors to The Buckeye Traction Ditcher Company, Findlay, Ohio, a corporation of Ohio Application May 7, 1936, Serial No. 78,418

5 Claims. (Cl. 305—10)

This invention relates to tread means of the crawler or endless track type.

An object of the invention is the provision of a novel and highly efficient tread means of this character particularly adapted for use on wheels of the double tire type.

A further object of the invention is the provision of a tread means of this character having tread links of novel form and pivotally secured together in a simple and efficient manner which will permit an easy and rapid assembling and disconnecting of the links.

Other objects and advantages of the invention will be apparent from the following detailed description, and from the accompanying drawings illustrating one form of the invention, and in which—

Figure 1 is a side elevation of a tread means embodying the invention applied to a wheel, with parts broken away; Fig. 2 is an enlarged section on the line 2—2 in Fig. 1; Fig. 3 is an enlarged fragmentary section on the line 3—3 in Fig. 1; Fig. 4 is an enlarged inner side view of a section of the tread chain with parts broken away; Fig. 5 is an enlarged section on the line 5—5 in Fig. 4; Fig. 6 is an enlarged section on the line 6—6 in Fig. 4, with parts in full; Fig. 7 is an enlarged section on the line 7—7 in Fig. 6, with parts broken away; Fig. 8 is an edge elevation of a chain link, with parts broken away, and Fig. 9 is a perspective view of one of the draft pins which is mounted in a link longitudinally of the chain.

Referring to the drawings, 1 designates a wheel having two laterally spaced tires 2, 2, in the present instance of the pneumatic type, and each being mounted on a respective rim 3. Each rim is fixedly mounted on the outer peripheral portion of a spider member 4, the inner edge of which has a laterally offset radial portion 4ª adapted in the ordinary use of the wheel to have flatwise abutment against the corresponding part of the other and to be secured thereto and to the hub flange 5 by bolts 6. The members 4 flare outwardly from each other without the inner edge portions 4ª thereof, so as to retain the adjacent edges of the rims 3, 3 in desired spaced relation.

The tread means comprising the invention includes a frame 10 mounted on the wheel between the spider members 4, 4 and rims 3, 3 for vertical rocking movements relative thereto, a rotatable guide 11 at each end of the frame, and an endless tread chain 12 extending above and below the tires 2, 2 in engagement therewith and around the guides 11.

The frame 10 has a central bearing portion 10ª and an extension 10ᵇ at each of opposite sides thereof relative to a vertical center line. The lower edges of the extensions 10ᵇ are substantially straight and parallel to the surfaces over which traveling. The frame is mounted on a bearing ring 14 which is inserted between the members 4, 4, maintaining the parts 4ª thereof in spaced relation, and being secured to one of said parts by bolts 15, after which the members 4, 4 and ring 14 are secured together and clamped to the hub flange 5 by the bolts 6. A bearing surface of babbitt metal or other suitable material 16 is mounted around the periphery of the ring 14 with its edges turned inwardly at the sides of the ring and engaged by inwardly projecting side flanges 17 secured to the frame sides around its bearing opening by bolts 18.

Each extension 10ᵇ of the frame 10 is provided at the under side of its outer end portion with a longitudinally disposed guide to which a bearing sleeve 20 is mounted for adjusting movements lengthwise of the frame and for free limited rocking movements transversely of the frame. Such frame guide, in the present instance, comprises an arcuate portion 21 which is straight lengthwise of the frame and curved transversely thereof, and which has its side edges extending beyond the frame sides in the form of lips which form a continuation of the guide arc. The sleeve 20 at its top has an arcuate bearing portion bearing against and complemental to the curved bottom surface of the guide 21, and has lips 22 engaging over the lips of the guide 21 to retain the sleeve in transverse rocking and longitudinal sliding engagement with the guide, as is apparent by reference to Fig. 2. A shaft 23 is journaled in the sleeve 20 and has an idler wheel 24 fixed to each end thereof without the sleeve and serving as a guide means for the tread chain 12, which travels therearound.

Each bearing sleeve 20 has its inner side thrust against a screw 25 which passes through guide parts 26 secured to the under side of the respective frame extension 10ᵇ and has its inward movements relative to the frame resisted by a coiled compression spring 27. This spring at one end has its thrust against the inner guide part 26 and has its outer end thrust against a nut 28 which is threaded on the screw 25 and is adjustable to vary the tension of the spring by a turning of the screw. When the tread chain 12 is removed from the bearing frame, the guide means 11 at each end of the frame is free to be moved outwardly on the associated guides 21 from engagement with the frame.

The chain 12 is made up of a plurality of links 30, each of which, in its present embodiment, is of rectangular form and elongated transversely of the chain to adapt it to span the two tires 2 of a wheel and to bear at its opposite end portions inward against the tread portions of the respective tires.

Each link is preferably of skeleton form and provided on its outer or ground engaging side with flanges 31 for firm traction engagement with the soil over which the unit passes. On the top of each link, centrally of its ends, are two bearing flanges 32 and 33, which are respectively adjacent to opposite side edges of the link and disposed lengthwise of such edges. The flange 32 is provided with a circular opening 34 while the flange 33 is provided with a slot-like opening 35 with the slot disposed substantially at right angles to the body of the link and with its ends preferably curved in arcs corresponding to the curve of the opening 34. These openings are in axial register. An ear 37 projects outward from each side edge of the slot 35, and provided in the outer face of the flange 33 in coaxial surrounding relation to the slot 35 and also extending into the inner end portion of each ear 37 is a circular recess 38. The bottom wall of this recess is preferably provided at each side of the slot 35 with a depression or groove 39 of circular form. The ears 37 have transversely registering openings 40 therethrough for receiving a pivot pin 41.

A draft pin 42 is mounted in the openings of the flanges 32 and 33 transversely of the link or lengthwise of the chain, and is provided at one end with a head for engaging the bottom wall of the recess 38 and at its other end with an enlargement through which the pin 41 of an adjoining link projects, thus providing a pivotal connection for successive links and which connection also serves as a means upon which the links may have limited rocking movements transverse to the chain.

The pins 42 are of T-form, having a cross or head portion a, a shank or leg portion b and an enlargement c at the free end portion of the leg. The enlargement c is of a cross-sectional shape corresponding to that of the slot opening 35 to permit it to be passed therethrough and fits into the opening 34 to have rotary movements therein. The head or cross portion a substantially corresponds in diameter to that of the recess 38 and is of a shape to adapt it to be turned in said recess so as to be positioned crosswise of the slot 35 and to have the inner sides of its arms seat in the respective recesses 39. The head a is also disposed crosswise of the narrow portion of the enlargement c, as best shown in Fig. 9, and the enlargement has a cross opening d in its outer end portion for receiving the cross pin 41.

In assembling the links of the chain, a draft pin 42 has its enlarged end c inserted through the slot 35, after which the pin is given a quarter turn to place the head a in position to pass between the ears 37 and into the recess 38, while at the same time the portion c is being passed through the opening 34. The pin is then given another quarter turn in either direction to place the broad dimension of the enlargement c in upright position and to place the head a crosswise of the slot 35 within the recess 38 and in position to seat in the depressions 39. The enlarged end is then inserted between the ears 37 in which a pin 42 has previously been mounted, and a pivot pin 41 is then inserted through such ears and the opening d in the draft pin 42. It is thus apparent that two adjoining links are connected for pivotal flexing movements on the pin 41 and have relative transverse rocking movements on the respective pins 42. Each pivot pin 41 is secured in position by a cotter pin 43, or in any other suitable manner.

The guide wheels 24 engage the inner sides of the links 30 at opposite ends of the flanges 32 and 33 adjacent thereto, so that the flanges serve to hold the chain transversely centered with respect to the guide means and to the tires 2. It is apparent that the frame 10 may be mounted with comparative ease between the spider members 4, 4 of a double wheel by simply removing the outer spider from its companion, then securing the bearing ring 14 to the inner side of such spider by means of the bolts 15 and mounting the frame 10 on such ring, after which this assembly is secured to the inner spider 14 of the wheel by means of the bolts 6. The chain 12, as is apparent, passes around the end guides 11 with its top run in engagement, through its links, with the tread portions of the tires at their tops and with its bottom run in engagement with the bottom tread surface of the tires. It is thus seen that the lower run of the chain not only supports the tires and forms the tread means therefor, but also that the chain is frictionally driven by its engagement with the tires and at the speed of rotation thereof. In order to compensate for the compression of the bottom portion of the tires where it rests on the links of the chain, and to prevent, or at least to minimize, the slippage between the chain and tires due to the lessening of the bottom radius of the tires, by reason of such compression, with respect to the length of the upper radius thereof, the pivotal connections 41 between the links are set a distance within the peripheral tread surfaces of the tires, as shown in Fig. 1.

When the tread means is in operation on a wheel, the guides 11 and the portions of the chain in engagement therewith may have limited transverse rocking movements to conform to irregularities in the surface over which traveling, and such irregularities may also be compensated for intermediate the guides by reason of the connections between the links permitting both transverse and longitudinal rocking movements of the links relative to each other.

The means disclosed for mounting the tread carrying frame on the wheel in a manner to permit free rotation of the wheel relative thereto is covered in a co-pending application Serial Number 113,872 filed Dec. 2, 1936.

We wish it understood that our invention is not limited to any specific construction, arrangement or form of the parts, as it is capable of numerous modifications and changes without departing from the spirit of the claims.

Having thus described our invention, what we claim as new, and desire to secure by United States Letters Patent, is:

1. In a tread chain of the class described, a plurality of tread links, flanges projecting from the inner surface of each link in spaced relation lengthwise of the chain and having axially aligned openings therethrough, one of said flanges having a pair of transversely perforated spaced ears projecting outwardly therefrom, a draft pin mounted in said openings and having axial thrust engagement at one end with the outer side of the flange from which the ears project and having its opposite end projecting beyond the other flange and transversely perforated, and a pivot pin extending through the perforations of said ears and draft pin.

2. In a tread chain of the class described, a plurality of tread links, each having a perforated flange on its inner side adjacent to its front and rear edges, a pair of ears projecting outwardly from one of said flanges at opposite sides of its perforation, a draft pin projecting through the flange perforations lengthwise of the chain and having one end in thrust engagement with the outer side of the flange from which the ears project and having its opposite end projected beyond the other flange and between the ears of an adjoining link, said pin permitting a transverse rocking of the link relative thereto, and a cross pivotal connection between said pin and the ears of the adjoining link.

3. In a tread chain of the class described, a plurality of links, each link having a forward flange and a rearward flange projecting from its inner side, one having a circular opening and the other a slot-like opening with said openings in axial register, a pair of ears projecting from the outer side of the flange having the slot opening with one ear at each side of the opening, a circular recess in the outer side of said last-mentioned flange in marginal relation to its openings, a draft pin having a cross head at one end and an enlargement at its other end, the enlargement being substantially complemental in cross-section to said slot opening to permit its passage therethrough and adapted to have rotatable bearing in said circular opening and to project therethrough beyond said latter opening and between the ears of an adjoining link when the pin is given a partial rotation to place its cross head crosswise of the slot opening within said recess, and means for pivotally connecting the interengaging portions of said ears and draft pin.

4. In a tread chain of the class described, a plurality of links which are elongated transversely of the chain and relatively narrow lengthwise thereof, and means connecting said links for relative transverse pivotal movements and for pivotal movements in the longitudinal plane of the chain, said means including both longitudinal and transverse pivot pins with one pin extending through the other.

5. In a tread chain of the class described, a plurality of links which are elongated transversely of the chain and each having a pair of flanges on its inner side disposed substantially centrally between the end edges of the links and being spaced transversely of the links in the plane of the chain, each link having a bearing opening therein, a draft pin mounted in the flange openings of each link and having a part at one end in thrust engagement with the outer side of one flange and a part at its opposite end projecting through and beyond the other flange of a link, and means pivotally connecting the projecting end of the pin of each link to the adjacent side of an adjoining link.

ROBERT N. BENNETT.
CHARLES L. GEORGE.